(12) United States Patent
Takahashi et al.

(10) Patent No.: US 6,992,801 B2
(45) Date of Patent: Jan. 31, 2006

(54) IMAGE READING SYSTEM, IMAGE READING APPARATUS, INFORMATION PROCESSING APPARATUS, CONTROL METHOD OF IMAGE READING APPARATUS, CONTROL METHOD OF INFORMATION PROCESSING APPARATUS AND COMPUTER READABLE STORAGE MEDIUM

(75) Inventors: Toshio Takahashi, Saitama (JP); Naofumi Sekine, Kanagawa (JP); Hideyuki Fujiwara, Kanagawa (JP); Kenichi Nanpei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 09/947,825

(22) Filed: Sep. 6, 2001

(65) Prior Publication Data

US 2002/0030860 A1    Mar. 14, 2002

(30) Foreign Application Priority Data

Sep. 8, 2000    (JP)    .............................. 2000-273163
Dec. 27, 2000    (JP)    .............................. 2000-399042

(51) Int. Cl.
    *H04N 1/04*    (2006.01)
(52) U.S. Cl. ...................... 358/474; 358/475; 358/487; 358/497
(58) Field of Classification Search ................ 358/487, 358/506, 497, 494, 509, 475, 474, 505; 250/227.11, 250/234–236, 216, 559.11; 355/67, 68, 18; 362/27, 800; 382/312, 318, 319
    See application file for complete search history.

(56) References Cited

U.S. PATENT DOCUMENTS

| | | | | |
|---|---|---|---|---|
| 5,781,311 A | * | 7/1998 | Inoue et al. | ................. 358/475 |
| 6,185,011 B1 | * | 2/2001 | William | ...................... 358/474 |
| 6,233,065 B1 | * | 5/2001 | Lee | ............................ 358/475 |
| 6,316,766 B1 | * | 11/2001 | Han | .......................... 250/234 |
| 6,486,980 B1 | * | 11/2002 | Sawanobori | ................ 358/487 |

(Continued)

FOREIGN PATENT DOCUMENTS

CN    1199979 A    11/1998

(Continued)

*Primary Examiner*—Cheukfan Lee
(74) *Attorney, Agent, or Firm*—Morgan & Finnegan, LLP

(57) ABSTRACT

It is an object of the present invention to provide an excellent image reading apparatus that realizes miniaturization and reduces a total reading time at the time of reading a transparent original and, in addition, improves operability. In order to attain this object, since the image reading apparatus has a configuration in which a light source driving circuit section is disposed to overlap in the upward direction separating from an original mounting surface of a surface light emitting section, an area occupied by the light source driving circuit section and the surface light emitting section on a horizontal surface becomes small and miniaturization can be realized. In addition, since the light source driving circuit section and the surface light emitting section can be disposed in a position close to a hinge section altogether, the center of gravity of an FAU is moved to the hinge section side, and rotatability of the hinge section becomes easy and is improved. Since an image reading unit has its hinge section side as an HP, a time taken by the image reading unit for moving from the HP to below the surface light emitting section, where a transparent original is disposed at the time of starting to read the transparent original, can be reduced.

1 Claim, 13 Drawing Sheets

U.S. PATENT DOCUMENTS 6,494,586 B1 * 12/2002 Huang et al. .................. 362/27
6,519,023 B1 *  2/2003 Chang ......................... 355/18
6,614,563 B1 *  9/2003 Batten et al. ................ 358/487
6,809,842 B1 * 10/2004 Tsai et al. .................... 358/471

FOREIGN PATENT DOCUMENTS

| JP | 8-116408 | 5/1996 |
| JP | 2000-050007 | 2/2000 |
| JP | 2004172805 A * | 6/2004 |

* cited by examiner

IMAGE READING SYSTEM, IMAGE READING APPARATUS, INFORMATION PROCESSING APPARATUS, CONTROL METHOD OF IMAGE READING APPARATUS, CONTROL METHOD OF INFORMATION PROCESSING APPARATUS AND COMPUTER READABLE STORAGE MEDIUM

FIELD OF THE INVENTION

The present invention relates to an image reading apparatus that is capable of reading a reflecting original and a transparent original.

In addition, the present invention relates to an image reading system, an image reading apparatus and an information processing apparatus that read an image signal using an image sensor such as a CCD and a CIS (contact image sensor) and A/D convert outputs of the reading to transfer the converted images to a connected computer to be a host and display the images thereon, a control method of the image reading apparatus, a control method of the information processing apparatus and a computer readable storage medium.

BACKGROUND OF THE INVENTION

Conventionally, as a scanner that is image reading apparatus of this type, there has been a scanner that is capable of reading two types of original: a transparent original such as a film and a reflecting original such as a photograph and a magazine.

In this type of scanner, a transparent original reading unit (Film Adapter Unit: hereinafter referred to as FAU) having a light source for reading a transparent original such as a film is attached to the upper part of a scanner for reading a reflecting original, whereby it is enabled to read both a reflecting original and a transparent original.

In an image reading apparatus of this FAU mounted type requires a specific control that is not performed in an image reading apparatus that reads a reflecting original only such as requiring an exclusive light source lighting control for lighting a light source according to a type of scanning.

FIG. 5 is a sectional view of a conventional scanner that is capable of reading a transparent original and a reflecting original. In FIG. 5, reference numeral 41 denotes a scanner main body and 42 denotes an FAU.

The FAU 42 is provided with a surface light emitting section 43 consisting of an expansion plate and a light source (not shown) such as a fluorescent lamp to be disposed in the vicinity of the expansion plate and a light source driving circuit section 44, and is rotatably connected to the scanner main body 41 by a high section 45.

The scanner main body 41 is provided with an electric circuit section 46 having an AD converter, an ASIC for image processing, an interface circuit and the like, an image reading unit 47 having a reflecting light source, a mirror, a lens and an image pick-up element such as three line CCD of RGB, a transparent platen glass 48 on which an original is mounted and a start button 49.

A two-dimensional image can be read by repeating reading in a main scanning direction by an image pick-up element while moving the image reading unit 47 in a sub-scanning direction (in the figure, an arrow X direction) when an original image on the original stand glass 48 is read in both a transparent original and a reflecting original.

An output of the image pick-up element of the image reading unit 47 is sent to the electric circuit section 46 via a not-shown cable, is subject to necessary processing such as AD conversion, shading correction and masking and is sent to an external apparatus such as a not-shown personal computer (hereinafter referred to as a PC) via a predetermined interface as digital image data.

In Japanese Patent Laid-Open No. 08-116408, a scanner is described in which the light source driving circuit section 44 for reading a transparent original in a scanner of this FAU 42 mounting type is disposed between the surface light emitting section 43 and the hinge section 45 and the center of gravity of the FAU 42 is moved to the vicinity of the hinge section 45, whereby the FAU 42 is allowed to rotate easily.

In addition, one of scanners in recent years is a scanner of a type in which a start button 49 for enabling start-up of an application and scan start is provided in the above-mentioned scanner main body 41. The scanner of this type has better operability than a scanner of a type that enables start-up of an application and scan start only by operation from a conventional scanner driver on a PC because it can share operation with a PC.

However, since the light source driving circuit section 44 for reading a transparent original is disposed between the surface light emitting section 43 and the hinge section 45 in the case of the conventional art as described above, the surface light emitting section 43 separates from the hinge section 45 by any means. Consequently, a sub-scan direction of the FAU 42 becomes inevitably long and is hard to be miniaturized.

In addition, in the case in which a waiting position of the image reading unit 47 is on the hinge section 45 side, the distance from the waiting position to the surface light emitting section 43 tends to be long due to the structure in which the surface light emitting section 43 is placed apart from the hinge section 45. Consequently, since a transparent original is arranged below the surface light emitting section 43 where it can receive light at the time of reading the transparent original, the image reading unit 47 has to be moved to below the surface light emitting section 43, when a moving distance of the image reading unit 47 is long. Thus, the image reading unit 47 takes time to move at the time of starting a transparent original and a total reading time at the time of reading the transparent original becomes long.

In addition, in the conventional scanner of the FAU42 mounting type, since the start button 49 is only provided in the scanner main body 41, a reading mode has to be set in advance in a reading mode of either a transparent original or a reflecting original in an application such as a scanner driver on a PC side. Consequently, if a desire reading mode and a set reading mode are different, it is necessary to change setting, which is inconvenience in operation.

In addition, in an image reading apparatus relative positions of a sensor for reading an image and a light source such as a lamp are modified between the case in which a so-called reflecting original such as ordinary printed matter is read and the case in which a transparent original such as a negative or positive film of a photograph.

At the same time, due to differences of an image reading sequence and a parameter, image reading software on a host PC to be used is that with different programs for a reflecting original and a transparent original in many cases or, even if identical software is used, that with different image reading sequences and various parameters is often used. Thus, image reading software on the host PC is generally designated and switched by a user according to a type of an original that is an object to be read.

In addition, although there is a scanner having a function of starting up image reading software on a host PC by pressing an image reading start button provided on an image reading apparatus recently, a transparent original unit is optional in many cases, and most of image reading start buttons on the image reading apparatus are for a reflecting original that are frequently used.

That is, in the conventional art, if a transparent original unit is optionally set in reading a transparent original, a user has to set the transparent original unit on an image reading apparatus main body, and then retrieve image reading software on a transparent original placed on a host PC to execute it and commence work for actually reading the transparent original.

Further, even if a transparent original reading unit is incorporated in an image reading apparatus as a standard, since the image reading button does not correspond to a transparent original, work similar to the above has to be performed after setting a transparent original on a transparent platen for a transparent original, which is low in work efficiency and extremely inconvenient.

SUMMARY OF THE INVENTION

The present invention has been devised in order to solve the above-mentioned problems of the conventional art, and it is an object of the present invention to provide an excellent image reading apparatus that realizes miniaturization and reduces a total reading time at the time of reading a transparent original and, in addition, improves operability.

In addition, it is an object of the present invention to make work for reading a reflecting original and a transparent original efficient.

In order to attain the above-mentioned objects, an image reading apparatus of the present invention is characterized in that it is configured as described below according to its first aspect.

That is, an image reading apparatus comprising: a transparent platen on which an original is mounted; an image reading unit for reading an original image while moving it via the original stand; and a transparent original reading unit including a surface light emitting section for lighting a transparent original mounted on the original stand from its back and a driving circuit section for driving the surface light emitting section, wherein said driving circuit section is disposed to overlap the surface light emitting section.

In addition, the image reading apparatus of the present invention is characterized in that it is configured as described below according to its second aspect.

That is, an image reading apparatus comprising: a transparent platen on which an original is mounted; an image reading unit for reading an original image while moving it via the original stand; and a transparent original reading unit including a surface light emitting section for lighting a transparent original mounted on the original stand from its back and a driving circuit section for driving the surface light emitting section, wherein a start button for a transparent original for reading a transparent original and a start button for a reflecting original for reading a reflecting original that can be read only by operation of the image reading unit are provided, respectively.

In addition, an image reading system of the present invention is characterized in that it is configured as described below.

That is, an image reading system comprising: an image reading apparatus that can execute image reading by a first image reading method and image reading by a second image reading method; and an information processing apparatus connected to the image reading apparatus, wherein the image reading system executes image reading by an image reading method designated according to operation of operating means provided in the image reading apparatus in order to designate the image reading method and operating means for instructing to start the image reading and displays a read image for previewing.

In addition, the image reading apparatus of the present invention is characterized in that it is configured as described below.

That is, an image reading apparatus that can execute image reading by a first image reading method and image reading by a second image reading method, comprising: a communication section for communicating with an external information processing apparatus; and an image reading start instruction operating section for designating the image reading method and instructing to start the image reading, wherein the image reading apparatus executes image reading by an image reading method designated by the control of the external information processing apparatus according to operation of the image reading start instruction operating section and displays a read image for previewing.

In addition, an information processing apparatus of the present invention is characterized in that it is configured as described below.

That is, an information processing apparatus in which image reading software is incorporated, comprising: communicating means for communicating with an external image reading apparatus; and changing means for, if a predetermined image reading method is designated by the external image reading apparatus, changing at least one of a sequence and a parameter of the image reading software in response to the image reading method.

In addition, another information processing apparatus of the present invention is characterized in that it is configured as described below.

That is, an information processing apparatus in which image reading software for a first image reading method and image reading software for a second image reading method are incorporated, wherein, if the image reading method is designated by an external image reading apparatus, the information processing apparatus selects image reading software corresponding to the image reading method, executes the selected software and displays for previewing an image read by the external image reading apparatus.

In addition, a control method of the image reading apparatus of the present invention is characterized in that it is configured as described below.

That is, a control method of an image reading apparatus that can execute image reading by a first image reading method and image reading by a second image reading method, comprising the steps of: if the image reading method is designated by operating means provided in the image reading apparatus, executing image reading by the image reading method designated by the control of an image processing apparatus connected to the image reading apparatus; and displaying the read image for previewing.

In addition, a control method of the information processing apparatus of the present invention is characterized in that it is configured as described below according to its first aspect.

That is, a control method of an information processing apparatus in which image reading software is incorporated, comprising the step of, if a predetermined image reading method is designated by an image reading apparatus connected to the information processing apparatus, changing at least one of a sequence and a parameter of the image reading software in response to the image reading method.

In addition, the control method of the information processing apparatus of the present invention is characterized in that it is configured as described below according to its second aspect.

That is, a control method of an information processing apparatus in which image reading software for a first image reading method and image reading software for a second image reading method are incorporated, comprising the steps of, if the image reading method is designated by an external image reading apparatus connected to the information processing apparatus, selecting image reading software corresponding to the image reading method; executing the selected software; and displaying for previewing an image read by the external image reading apparatus.

In addition, a computer readable storage medium of the present invention is characterized in that it is configured as described below according to its first aspect.

That is, a computer readable storage medium in which a program for controlling an image reading apparatus that can execute image reading by a first image reading method and image reading by a second image reading method is stored, wherein the storage medium stores a program for executing image reading processing for, if the image reading method is designated by the image reading apparatus, executing image reading by the designated image reading method and displaying the read image for previewing.

In addition, the computer readable storage medium of the present invention is characterized in that it is configured as described below according to its second aspect.

That is, a computer readable storage medium in which a program for controlling an information processing apparatus is stored, wherein the storage medium stores a program for executing change processing for, if a predetermined image reading method is designated by an image reading apparatus connected to the information processing apparatus, changing at least one of a sequence and a parameter of image reading software corresponding to the image reading method.

In addition, the computer readable storage medium of the present invention is characterized in that it is configured as described below according to its third aspect.

That is, a computer readable storage medium in which a program for controlling an information processing apparatus in which image reading software for a first image reading method and image reading software for a second image reading method are incorporated is stored, wherein the storage medium stores a program for, if the image reading method is designated by an image reading apparatus connected to the information processing apparatus, selecting image reading software corresponding to the image reading method, executing the selected software and displaying the read image for previewing.

Other objects and advantages besides those discussed above shall be apparent to those skilled in the art from the description of a preferred embodiment of he invention which follows. In the description, reference is made to accompanying drawings, which form a part hereof, and which illustrate an example of the invention. Such an example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will now be hereinafter described illustratively in detail with reference to the accompanying drawings. However, it is not meant that dimensions, materials and forms of components and their relative arrangement described in the embodiments limit the scope of the present invention only to those unless specifically described.

[First Embodiment]

An embodiment will be described with reference to FIGS. 1 to 4.

Figure 1:
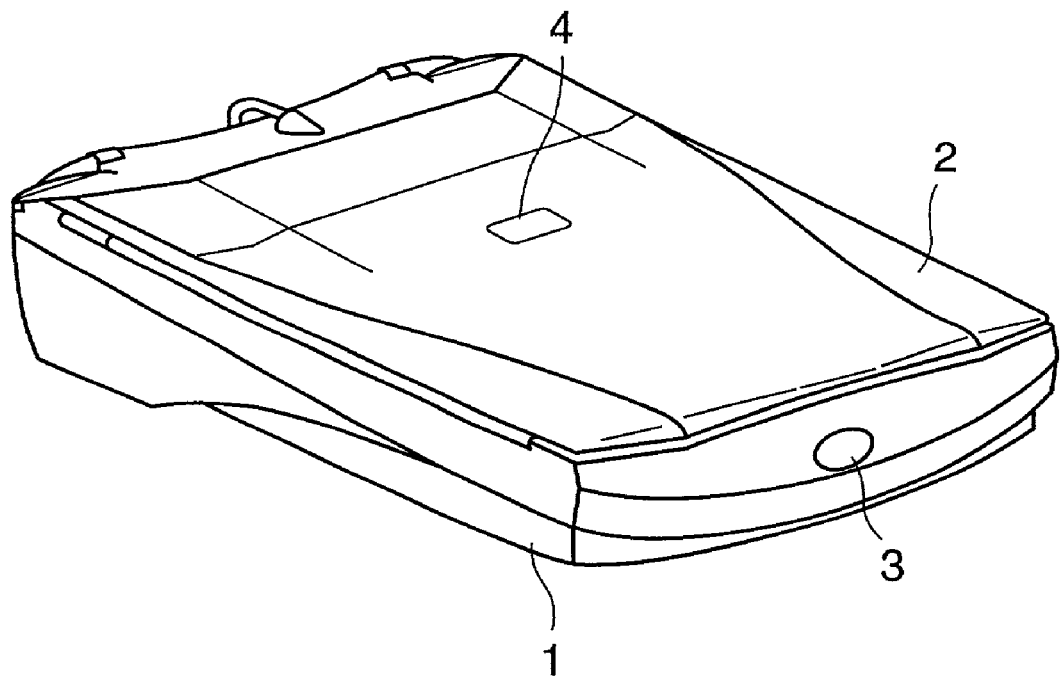
FIG. 1 is a perspective view showing an image reading apparatus in accordance with an embodiment.

FIG. 1 is a perspective view showing a scanner as an image reading apparatus that is capable of reading a transparent original and a reflecting original in accordance with the embodiment.

First, reference numeral 1 denotes a scanner main body and 2 denotes a transparent original reading unit (hereinafter referred to as an FAU) having a light source or the like for lighting a transparent original.

In addition, reference numeral 3 denotes a start button for a reflecting original provided in the scanner main body 1 and 4 denotes a start button for a transparent original provided in the FAU 2. When these two start buttons 3, 4 are depressed, information that the buttons are depressed is transferred to a not-shown PC being an external apparatus via a not-shown predetermined interface cable (e.g., USB, SCSI, parallel or the like) from the scanner main body 1.

Figure 2:
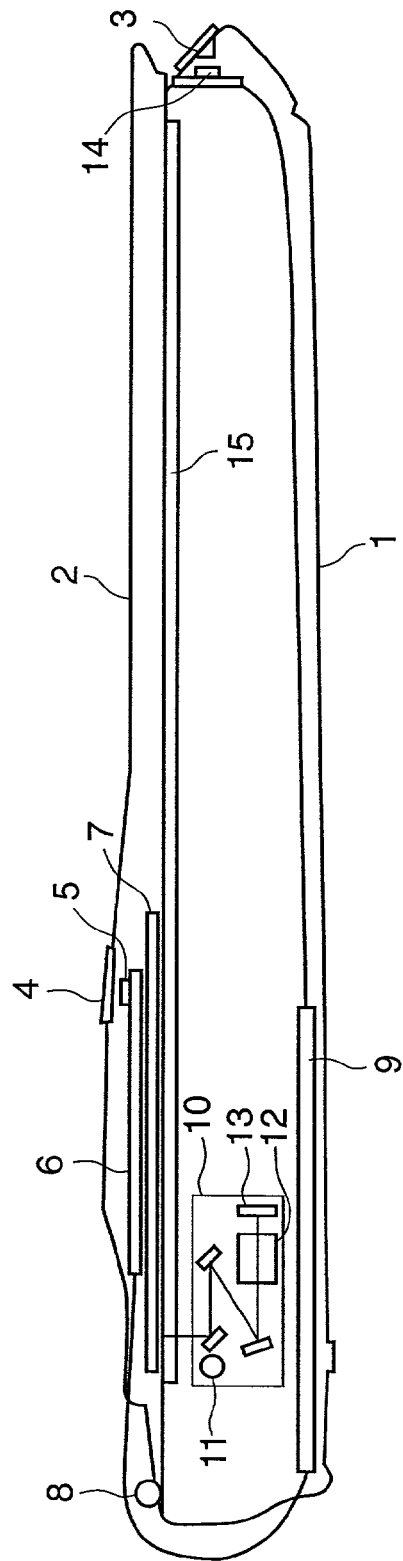
FIG. 2 is a sectional view showing the image reading apparatus in accordance with the embodiment.

FIG. 2 is a sectional view showing the scanner of FIG. 1.

Reference numeral 5 denotes a tact switch as an electric switch section, which detects that the start button for a transparent original 4 is depressed. The tact switch 5 is connected to an electric circuit section 9 to be described later by a signal cable.

Reference numeral 6 is a light source driving circuit section for a transparent original as a driving circuit section, which is a circuit for lighting a light source for a transparent original to be described later and driving a surface light emitting section 7.

Reference numeral 7 denotes a surface light emitting section provided with a light source for a transparent original such as a fluorescent lamp and a diffusing member for diffusing light incident from the light for a transparent original. A transparent original is disposed on a transparent platen glass 15 and read and scanned under this surface light emitting section 7.

Reference numeral 8 denotes a hinge section that rotatably attaches the FAU 2 to the scanner main body 1.

The tact switch 5, the light source driving circuit section 6, the surface light emitting section 7 and the hinge section 8 described above are provided in the FAU 2.

In addition, reference numeral 9 denotes an electric circuit section disposed in the scanner main body 1, having an AD converter, an ASIC for image processing, an interface circuit or the like, which is connected to the light source driving circuit section 6 by a cable.

Reference numeral 10 is an image reading unit, which has a light source for a reflecting original 11, a mirror, a lens 12 and an image pick-up element 13 such as a CCD.

The electric circuit section 9 and the image reading unit 10 are for performing operations that are basically similar to those of the electric circuit section 46 and the image reading unit 47 described in the conventional example. An output of the image pickup element 13 is inputted in the electric circuit section 9 by a not-shown cable and processed.

Reference numeral 14 is a tact switch similar to the tact switch 5 and is for detecting that the start button 3 for a reflecting original is depressed. The tact switch 14 is connected to the electric circuit section 9 by a signal cable as the tact switch 5 is connected.

Reference numeral 15 denotes a transparent platen glass for mounting a transparent original or a reflecting original.

A two-dimensional image can be read by repeating reading in a main scanning direction by an image pickup element while moving the image reading unit 10 in a sub-scanning direction (in the figure, the right direction) when an original image on the original stand glass 15 is read in both a transparent original and a reflecting original.

An arrangement and a configuration of each part in the FAU 2 which are characteristic parts of this embodiment will now be described more in detail.

Figure 3:
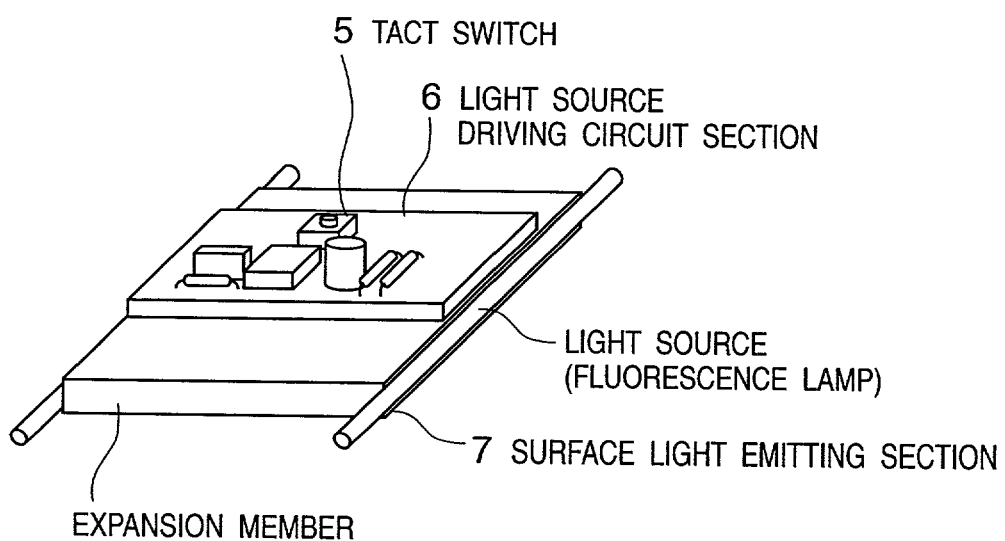
FIG. 3 is a perspective view showing an arrangement of a driving circuit and a surface light emitting section in accordance with the embodiment.

First, the light source driving circuit section 6 is disposed in a direction perpendicular to the surface of the surface light emitting section 7 and above the surface light emitting section 7 as shown in FIG. 3. That is, the light source driving circuit section 6 is disposed to overlap an original mounting surface of the surface light emitting section 7 in the direction separating from it.

Further, the light source driving circuit section 6 and the surface light emitting section 7 may be configured as one unit in advance.

Consequently, an area occupied by a horizontal surface inside the FAU 2 of the light source driving circuit section 6 and the surface light emitting section 7 becomes smaller, which is conventionally large. Then, it becomes possible to reduce the length in the sub-scanning direction of the FAU 2.

In addition, it becomes possible to disposed the light source driving circuit section 6 and the surface light emitting section 7 altogether in a position close to the hinge section 8 side by overlapping the light source driving circuit section 6 and the surface light emitting section 7 in this way.

Consequently, the center of gravity of the FAU 2 can be moved further to the hinge section 8 side than it conventionally is, and rotation of the hinge section 8 becomes easy and operability is improved.

In addition, the image reading unit 10 of the scanner main body 1 of this embodiment has a waiting position (home position, hereinafter referred to as HP) on the hinge section 8 side.

On the other hand, since the light driving circuit section 6 and the surface light emitting section 7 overlap each other, the surface light emitting section 7 can be disposed in a position as close as the hinge section 8 side without being hindered by the light source driving circuit section 6 as conventionally is.

Consequently, if the HP of the image reading unit 10 is on the hinge section 8 side, since the distance from the HP to the surface light emitting section 7 is reduced, it becomes possible to reduce a time required for the image reading unit 10 to move from the HP to below the surface light emitting section 7 where a transparent original is disposed at the time of starting to read the transparent original.

As described above, in the image reading apparatus in accordance with this embodiment, an operator can rotate the FAU 2 easily, the image reading apparatus can be miniaturized, and a total reading time at the time of reading a transparent original can be reduced.

Here, attention is further paid to a positional relation between the original stand glass 15 and the surface light emitting section 7 and the size of the surface light emitting section 7 itself.

The surface light emitting section 7 is disposed in a position on the original stand glass 15, where the surface light emitting section 7 lights only the half of the original stand glass 15 on the hinge section 8 side toward the opposite side in the sub-scanning direction from a position closest to the HP.

This is because a transparent original to be read most in general is a 35 mm film and the surface light emitting section 7 for a transparent original is not required to light a too large area on the original stand glass 15.

For example, although the original stand glass 15 is required A4 size, it is sufficient if an area to be lit by the surface light emitting section 7 is in the order of 6 cm×8 cm, even if an extra area for shading data preparation is provided, in order to read a 35 mm film being a transparent original.

In addition, the image reading apparatus is configured as described above because the center of gravity can be more intensively moved to the hinge section 8 side than in the configuration in which the entire original stand glass 15 is lit.

Moreover, in the image reading apparatus in accordance with this embodiment, a start button 4 for a transparent original is provided separately from the start button 3 for a reflecting original in order to improve operability. In this case, a setting position of the start button for a transparent original 4 that is separately provided for improving operability affects rotatability of the above-mentioned FAU 2.

That is, if the start button for a transparent original 4 is provided on a side close to the start button 3 for a reflecting original in FIG. 1 in the sub-scanning direction, that is on the downstream side in the reading direction (on the opposite side of the hinge section 8), the easiness of the rotatability of the FAU 2 is damaged.

This is caused by the center of gravity of the FAU 2 separating from the hinge section 8 side by the weight due to a holding structure of the start button for a transparent original 4 (a mechanism for floating the start button for a transparent original 4 on a housing to movably fix it, or the like) and a directly responding transmitting material of the tact switch 5, a substrate or the like moving to the opposite side of the hinge section 8.

In addition, increasing a thickness on the opposite side of the hinge section 8 of the housing of the FAU 2 in order to accommodate the holding structure, the tact switch 5, the substrate or the like is also a factor of the center of gravity of the FAU 2 separating from the hinge section 8.

Thus, in this embodiment, the start button 4 for a transparent original is disposed on a side close to the hinge section 8 side. Its desirable position is the vicinity of the light source driving circuit section 6.

That is, if the image reading apparatus has a structure based on a configuration for realizing miniaturization while having easy rotatability of the FAU 2, it is desirable that the light source driving circuit section 6 overlaps the surface light emitting section 7 in the direction perpendicular to the surface of the surface light emitting section 7 and the start button for a transparent original 4 is further provided in the vicinity of the light source driving circuit section 6.

This is due to reasons such as convenience of running a not-shown signal line cable from the tact switch 5 and easiness to dispose the tact switch 5 because of the housing of the FAU 2 having thickness for accommodating the light source driving circuit section 6 and the surface light emitting section 7.

Moreover, the tact switch 5 is provided on an identical substrate as the light source driving circuit section for a transparent original 6, whereby the number of parts can be reduced.

Further, it is not necessary to provide them on the identical substrate and there is no serious problem as long as the tact switch 5 is provided in the vicinity of the light source driving circuit section 6. However, it is preferable to provide them on an identical substrate when taking into account an advantage of costs and improving easiness to assemble, or the like by integrating the light source driving circuit section 6, the surface light emitting section 7, the tact switch 5 and the like into one unit.

Figure 4:
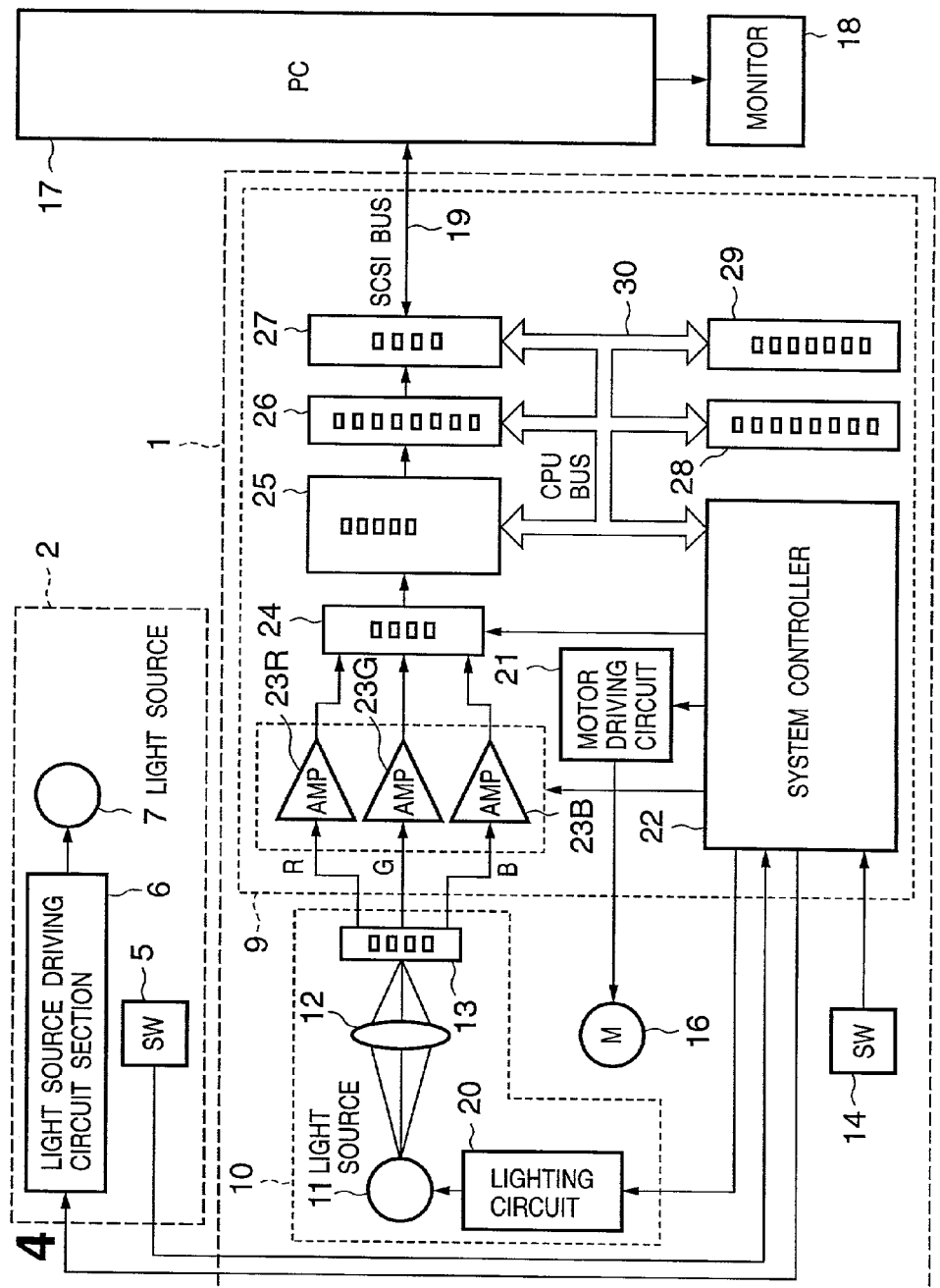
FIG. 4 is a functional block diagram showing a system including the image reading apparatus in accordance with the embodiment.
Figure 5:
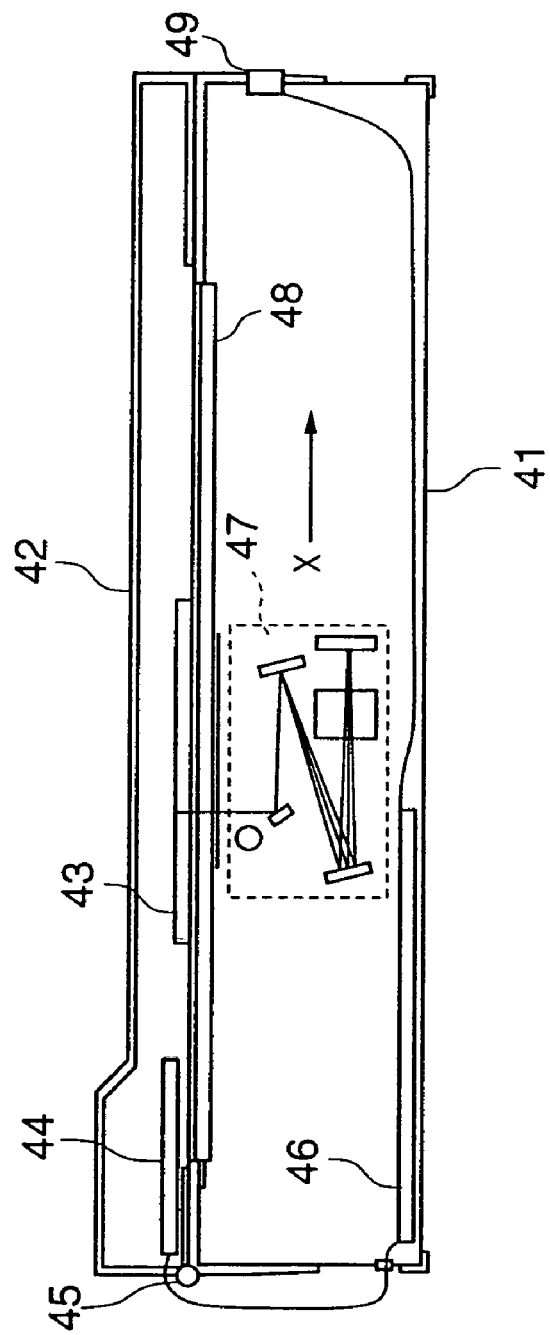
FIG. 5 is a sectional view showing a conventional image reading apparatus.

FIG. 4 is a functional block diagram showing a system including the scanner in accordance with this embodiment. Functional blocks for the parts described in FIGS. 1 and 2 are assigned identical numbers.

In the image reading unit 10, reference numeral 20 denotes a light source lighting circuit for lighting a light source 11.

In the electric circuit section 9, reference numeral 21 denotes a motor driving circuit for a pulse motor 16, which outputs an excitation switching signal of the pulse motor 16 by a signal from a system controller 22 that is system controlling means of the scanner main body 1.

Reference numerals 23R, 23G and 23B denote analog gain regulators, which have a configuration capable of variably amplifying an analog image signal outputted from the image pick-up element (line sensor) 13.

Reference numeral 24 denotes an A/D converter, which converts an analog image signal outputted from the variable analog gain regulator 23 into a digital image signal.

Reference numeral 25 denotes an ASIC, which performs image processing such as offset correction, shading correction, digital gain adjustment, color balance adjustment, masking, change of resolution in the main scanning and sub-scanning directions and image compression with respect to an image signal that has converted into a digital signal.

Reference numeral 26 denotes a line buffer, which is a part for temporarily storing image data and is realized in a general purpose random access memory.

Reference numeral 27 denotes an interface section, which is for communicating with a PC 17. Although it is realized by an SCSI controller here, it is also possible to employ another interface such as Centronics and USB.

Reference numeral 28 denotes an offset RAM used as a working area in performing image processing. Since the image pick-up element 13 has line sensors for RGB disposed in parallel with a predetermined offset, respectively, this offset RAM 28 is used for correction of offsets among the RGB lines. In addition, the offset RAM 28 also temporarily stores various kinds of data such as shading correction. This is realized by a general purpose random access memory here.

Reference numeral 29 denotes a gamma RAM for storing a gamma curve and performing gamma correction.

Reference numeral 22 denotes a system controller storing a sequence of the entire scanner, which performs various controls in accordance with an order from the PC 17.

Reference numeral 30 denotes a system bus for connecting the system controller 22, the ASIC 25, the line buffer 26, the interface section 27, the offset RAM 28 and the gamma RAM 29, which is composed of an address bus and a data bus.

Reference numeral 18 denotes a display monitor for the PC 17 and 19 denotes an interface bus that is composed of an SCSI bus here as an example.

In addition, applications such as a scanner driver are installed in a not-shown hard disk of the PC 17. As these applications, separate or identical applications having two modes can be prepared for a transparent original and a reflecting original.

An operator can start a scanner driver by operation form a mouse or a keyboard (not shown) on the PC 17 or depression of the start buttons 3 and 4.

The starting of the scanner driver by the depression of the start buttons 3 and 4 can be realized by, for example, monitoring information on depression of the start buttons 3 and 4 with a button monitoring application for starting a scanner driver always started on a PC.

An application for monitoring depression of the start buttons 3 and 4 receives information from the system controller 22 that has detected depression of the start buttons 3 and 4 via an interface and starts an application such as a scanner driver for a transparent original or a reflecting original.

As an example of operation of the image reading system shown in FIG. 4, an outline of operation in the case in which the start button for a transparent original is depressed will be hereinafter described.

First, when the start button for a transparent original 4 is depressed, the depression is detected by the tact switch 5 and a signal is sent to the system controller 22 through a signal line.

The system controller 22 detects the signal to detect that the start button 4 for a transparent original has been depressed and transmits a notice to that effect to the PC 17 via the interface section 27 and the interface bus 19. In the PC 17, the monitoring application then determines which of the start buttons 3 and 4 has been depressed from the information on detection of button depression.

Here, the monitoring application knows that the start button for a transparent original 4 has been depressed from identification information of the start buttons 3 and 4 existing in the information on detection of button depression.

Thereafter, the scanner driver for a transparent original is started via the operation system of the PC 17. The starting operation itself is not different from starting operation of a conventional single button.

Another diver application is associated with each of the start buttons 3 and 4 or a driver is set in advance to be started in another mode, whereby operation of this embodiment becomes possible.

In this case, the driver transmits a scan command for reading a transparent original image in a mode such as two values of resolution and color, or the like that is set in advance to the scanner main body 1.

The system controller 22 then controls each part based on the scan command and utilizes a not-shown driving system such as a motor, a belt, a gear and the like to move the image reading unit 10 to the sub-scanning direction, thereby reading an image of an original on the original stand glass 15.

The read image is digitized and subject to necessary image processing, and then sent to the PC 17 to be displayed on the display monitor 18.

Since a scan command for a transparent original is instructed by the start button 4 for a transparent original being depressed in this case, the system controller 22 controls the surface light emitting section 7 of the FAU 2 to light.

That is, when information on depression is sent to the PC 17 at the time of depressing the start button, since either the start button 3 or 4 is identified, the system controller 22 can also light the surface light emitting section 7 or the light source 11 according to the identification at the time of detecting the start button depression to realize stabilization of an amount of light to be used. In particular, it is effective in the case in which a used light source has an unfavorable temperature property at first transition such as a fluorescent lamp or the like.

As described above, this embodiment disposes a driving circuit surface to overlap a surface light emitting section, thereby enabling to miniaturizing an apparatus. In addition, since it also becomes possible to dispose the surface light emitting section toward a hinge section, miniaturization becomes possible while improving rotatability of the hinge section. Moreover, since a distance from a waiting position of an image reading unit to a position for reading a transparent original is reduced, a total reading time at the time of reading a transparent original can also be reduced.

In addition, an operator can surely and easily perform operations of both transparent original reading and reflecting original reading.

[Second Embodiment]

Figure 6:
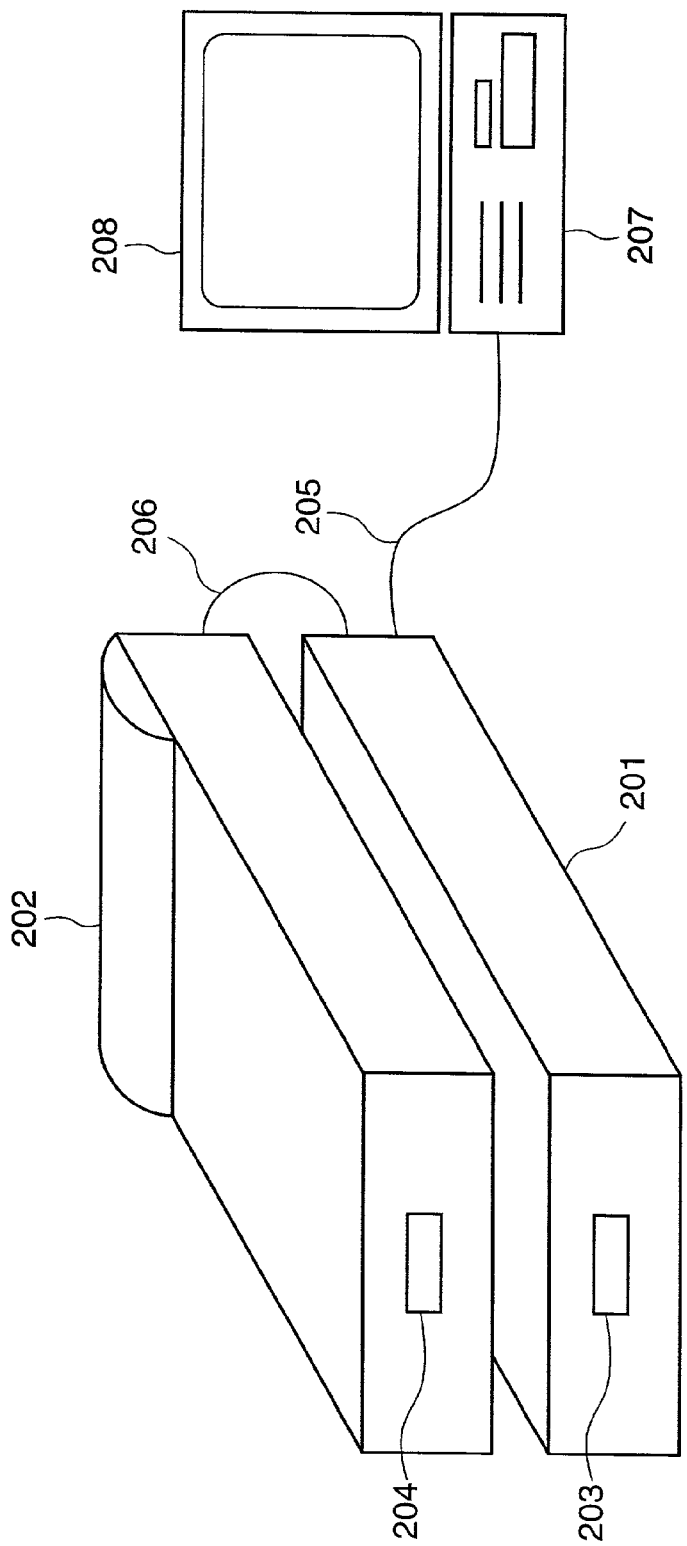
FIG. 6 is a view showing an image reading system of a first embodiment.

FIG. 6 is a view showing an image reading system of a second embodiment. In this view, reference numeral 201 denotes an image reading apparatus, 202 denotes a transparent original unit, 203 denotes an image reading starting button for a reflecting original provided in the image reading apparatus 201, 204 denotes an image reading starting button for a transparent original provided in the transparent original unit 202, 205 denotes a communication line between the image reading unit 201 and a host PC 207, 206 denotes a communication line between the image reading apparatus 201 and the transparent original unit 202, 207 denotes a host PC, and 208 denotes a monitor connected to the host PC 207.

Figure 7:
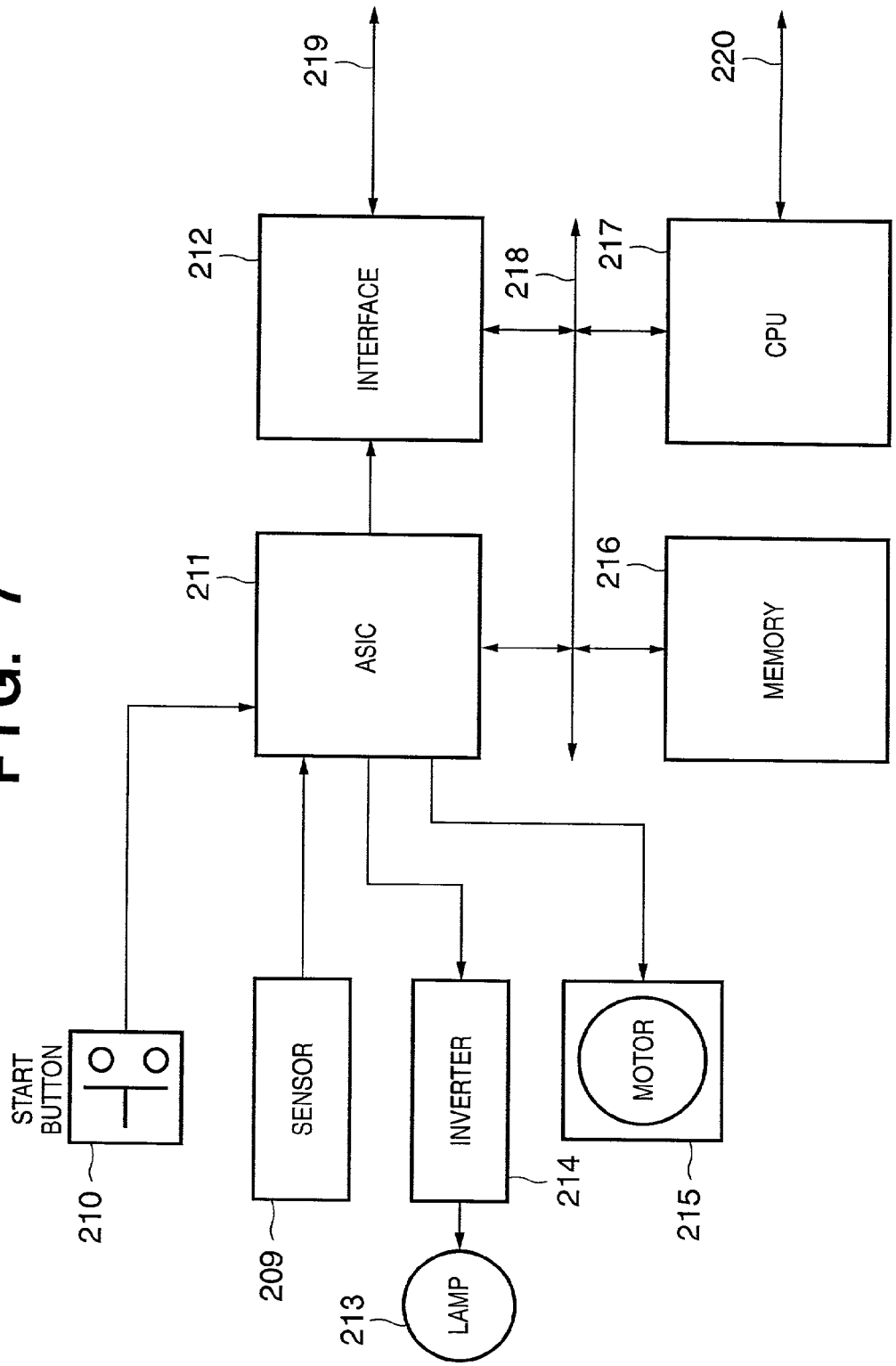
FIG. 7 is an internal block diagram of an image reading apparatus.

FIG. 7 is an internal block diagram of the image reading apparatus 201. In the figure, reference numeral 209 denotes an image reading section, 210 denotes an image reading starting button (corresponding to the image reading starting button for a reflecting original 203 of FIG. 6), 211 denotes an ASIC (Application Specific Integrated Circuit), 212 denotes a communication interface with the host PC 207, 213 denotes a lamp for reading a reflecting original, 214 denotes a control section of the lamp 213, 215 denotes a motor, 216 denotes a memory, 217 denotes a CPU, 218 denotes a bus, 219 denotes a communication line with the host PC 207 (corresponding to the communication line 205 of FIG. 6), and 220 denotes a communication line with the transparent original unit 202 (corresponding to a communication line 206 of FIG. 6).

Figure 8:
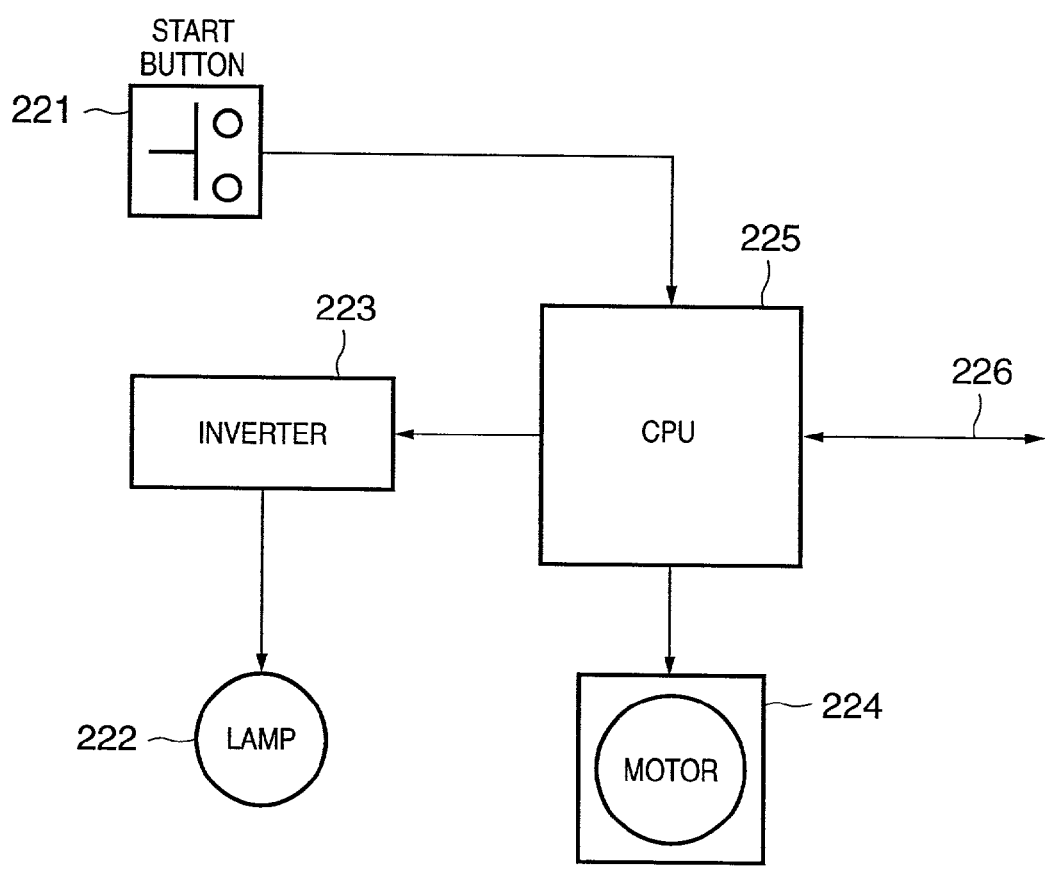
FIG. 8 is an internal block diagram of a transparent original unit.

FIG. 8 is an internal block diagram of the transparent original unit 202. In the figure, reference numeral 221 denotes an image reading starting button (corresponding to the image reading starting button for a transparent original 204 of FIG. 6), 222 denotes a lamp for reading a transparent original, 223 denotes a control section of the lamp 222, 224 denotes a motor, 225 denotes a CPU, and 226 denotes a communication line with the image reading apparatus 201 (corresponding to the communication line 206 of FIG. 6).

Figure 9:
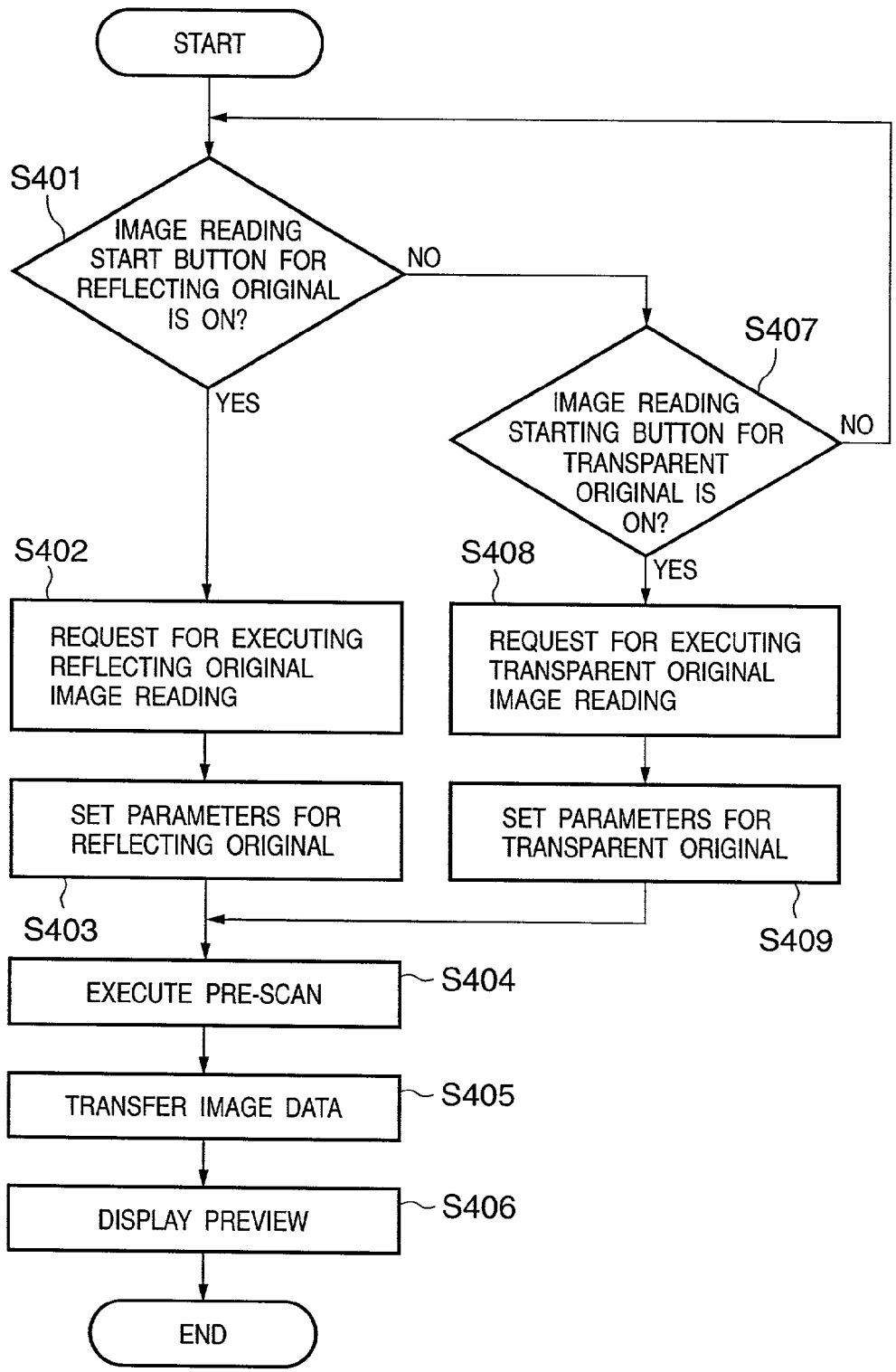
FIG. 9 is a flow chart describing an outline of operations in the image reading system of the first embodiment.

An outline of operation in the above-mentioned image reading system will now be described with reference to a flow chart of FIG. 9. The image reading apparatus 201 has the image reading starting button for a reflecting original 203 and is connected to the host PC 207 by the communication line 205 and to the transparent original unit 202 by the communication line 206. The transparent original unit 202 has the image reading button for a transparent original 204 and is connected to the image reading apparatus 201 by the communication line 206. The host PC 207 is connected to the image reading apparatus 201 by the communication line 205 and also connected to the monitor 208 for displaying a read image.

Usually, the image reading apparatus 201 initializes hardware and then enters a standby state if a power supply is simply turned on.

Here, a user sets an original that the user wishes to read in the image reading apparatus 201 and then, in the case in which the original is a reflecting original such as normal printed matter or the like, presses the image reading starting button for a reflecting original 210 (203).

The depression of the image reading starting button for a reflecting original 210 (203) is detected by the CPU 217 connected to the ASIC 211 by the system bus 218 (step S401), and a request for image reading processing of a reflecting original generated by the CPU 217 is transmitted to the host PC 207 via the system bus 218, the communication interface section 212 and the communicating means 219 (205) again (step S402).

In this case, the host PC 207 executes reading software for a reflecting original installed previously and transmits various parameters and an image reading starting command that are required for initial reading of an image to the image reading apparatus 201 in order to perform preview display (step S403).

The CPU 217 in the image reading apparatus 201 that has received the various parameters and the image reading command sets respective hardware, and then drives the motor 215, moves the image reading section 209 and the lamp for reading a reflecting original 213 along the original and performs image reading of the reflecting original (step S404).

Image data of the read original is transmitted to the host PC 207 via the communication line 219 (205) (step S405), and the host PC 207 displays the image data on a screen of the monitor 208 connected to it as a preview screen (step S406).

On the other hand, if the original set in the image reading apparatus 201 is a transparent original such as a negative or positive film or the like of a photograph, the user presses the image reading starting button for a transparent original 221 (204) provided in the transparent original unit 202.

The depression of the image reading starting button for a transparent original 221 (204) is detected by the CPU 225 in the transparent original unit (step S407), and a transparent original reading request is once transmitted to the CPU 217 in the image reading apparatus 201 via the communication line 226 (206) and further to the host PC 207 via the system bus 218, the communication interface section 212 and the communication line 219 (205) (step S408).

In this case, the host PC 207 executes reading software for a transparent original that is installed previously and transmits various parameters and image reading starting command that are required for initial reading of an image to the image reading apparatus 201 in order to perform preview display (step S409).

The CPU 217 in the image reading apparatus 201 that has received the various parameters and the image reading command sets respective hardware and transmits a necessary command to the CPU 225 in the transparent original unit 202, and then drives the motor 215 in the image reading apparatus 201 and the motor 224 in the transparent original unit 202, synchronizes the lamp for reading a transparent original 222 in the transparent original unit 202 and the image reading section 209 and the lamp for reading a reflecting original 213 in the image reading apparatus 201 and moves them along the original to perform image reading of the transparent original (step S404).

Image data of the read original is transmitted to the host PC 207 via the communication line 219 (205) (step S405), and the host PC 207 displays the image data on a screen of the monitor 208 connected to it as a preview screen (step S406).

As described above, the image reading starting button for a reflecting original 203 and the image reading starting button for a transparent original 204 are provided in the image reading apparatus 201 and the transparent original unit 202, respectively, the reading starting button for a reflecting original 203 is pressed if an original to be read is a reflecting original and the reading starting button for a transparent original 204 is pressed if the original to be read is a transparent original, and contents of an image reading starting request are selected according to a type of the pressed button to be transmitted to the host PC 207.

The host PC 207 that has received the image reading starting request executes image reading software corresponding to the contents and transmits various parameters and an image reading starting command corresponding to respective image reading software 201.

The image reading apparatus 201 performs pre-scan and transmits the read image to the host PC 207 after setting respective hardware according to the various parameters and the command set by the host PC 207, and the host PC 207 displays the image on the monitor 208 as a preview image.

With the above-mentioned configuration, a user can easily perform image reading of a reflecting original and a transparent original without retrieving and designating image reading software previously according to an original of an image to be read.

[Third Embodiment]

Figure 10:
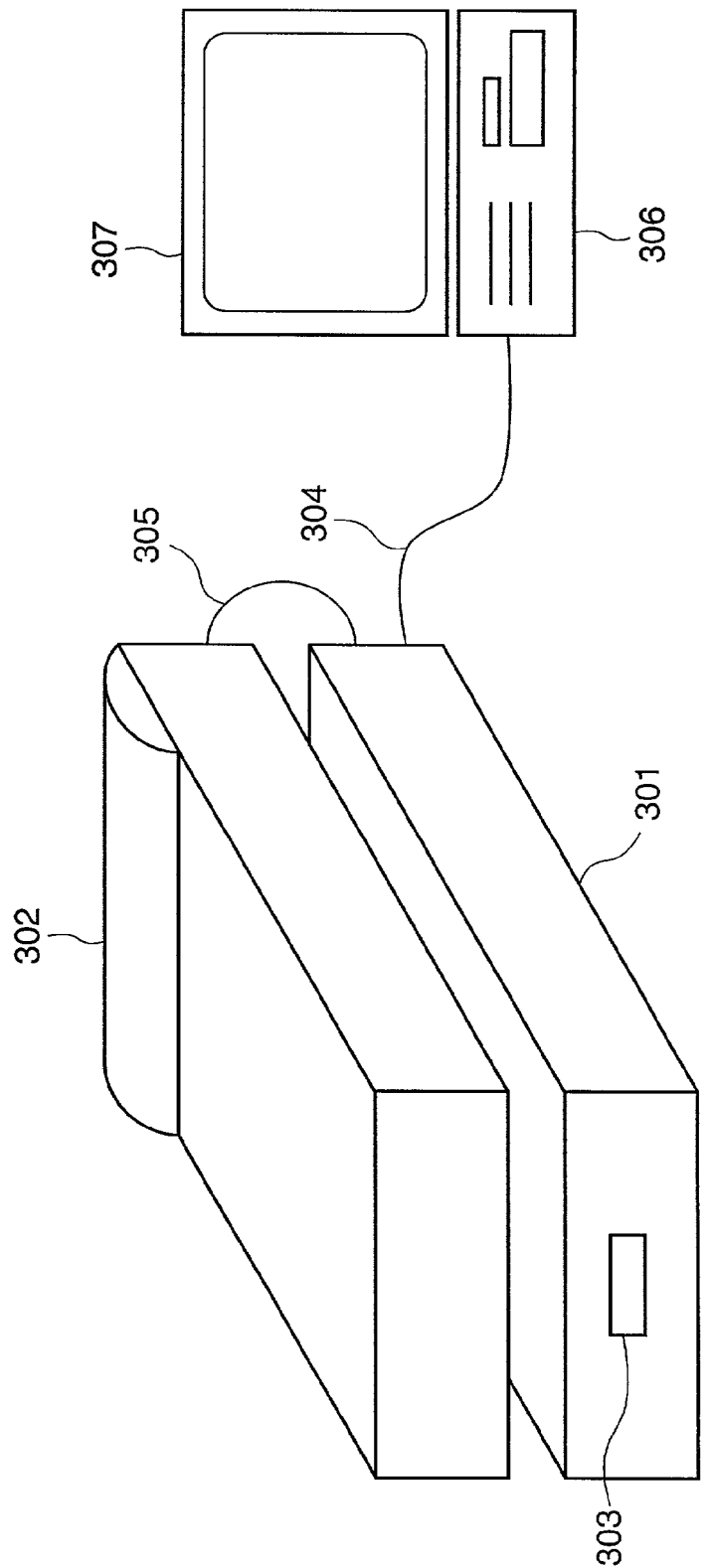
FIG. 10 is a view showing an image reading system of a second embodiment.

FIG. 10 is a view showing an image reading system of a third embodiment. In this figure, reference numeral 301 denotes an image reading apparatus, 302 denotes a transparent original unit, 303 denotes an image reading starting button provided in the image reading apparatus 301, 304 denotes a communication line between the image reading apparatus 301 and the host PC 306, 305 denotes a communication line between the image reading apparatus 301 and the transparent original unit 302, 306 denotes a host PC, and 307 denotes a monitor connected to the host PC 306.

Figure 11:
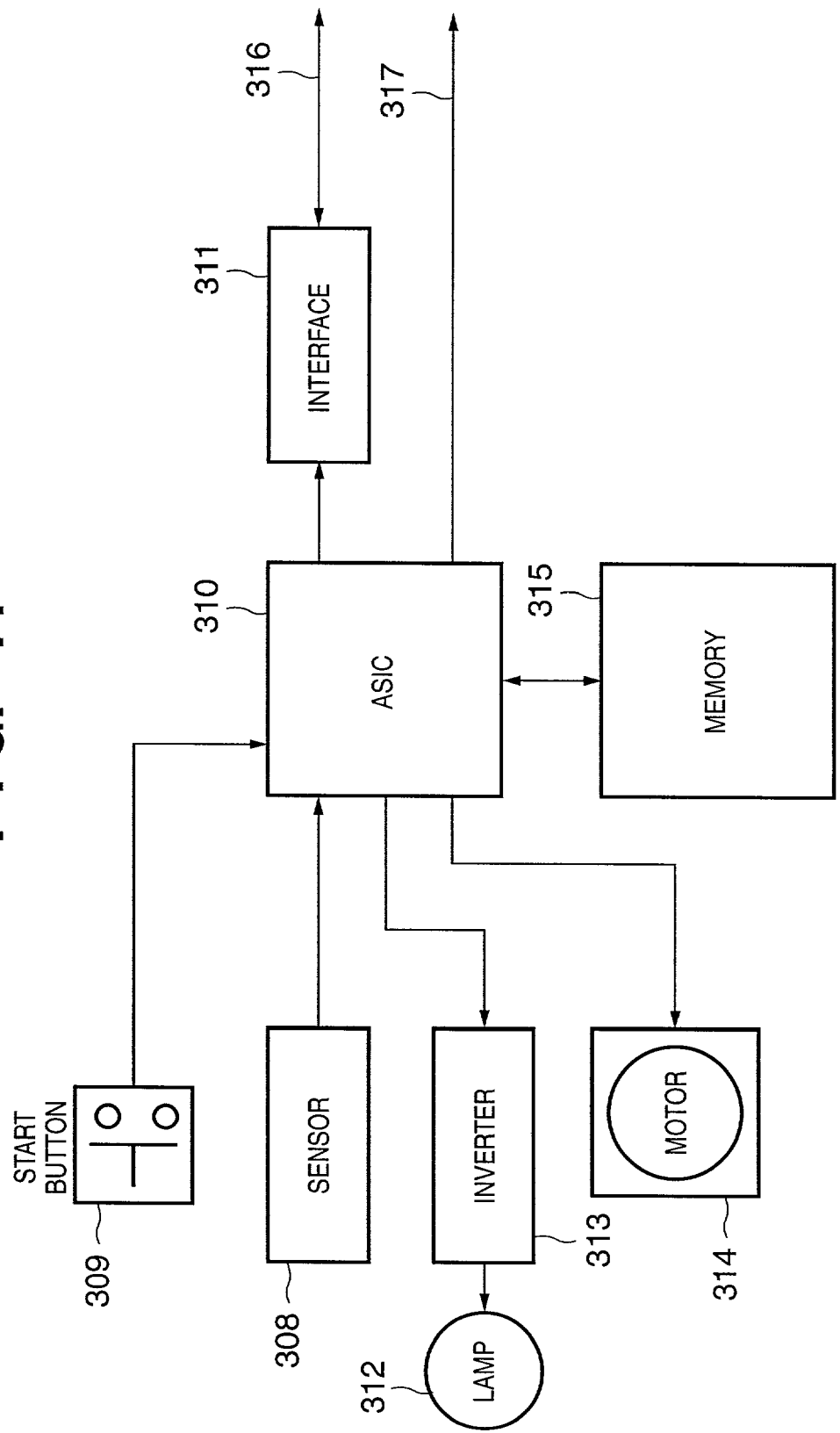
FIG. 11 is an internal block diagram of an image reading apparatus.

FIG. 11 is an internal block diagram of the image reading apparatus 301. In the figure, reference numeral 308 denotes an image reading section, 309 denotes an image reading starting button (corresponding to the image reading starting button 303 of FIG. 10), 310 denotes an ASIC, 311 denotes a communication interface section with the host PC 306, 312 denotes a lamp for reading a reflecting original, 313 denotes a control section of the lamp 312, 314 denotes a motor, 315 denotes a memory, 316 denotes a communication line with the host PC 306 (corresponding to the communication line 304 of FIG. 10), and 317 denotes a communication line with the transparent original unit 302 (corresponding to the communication line 305 of FIG. 10).

Figure 12:
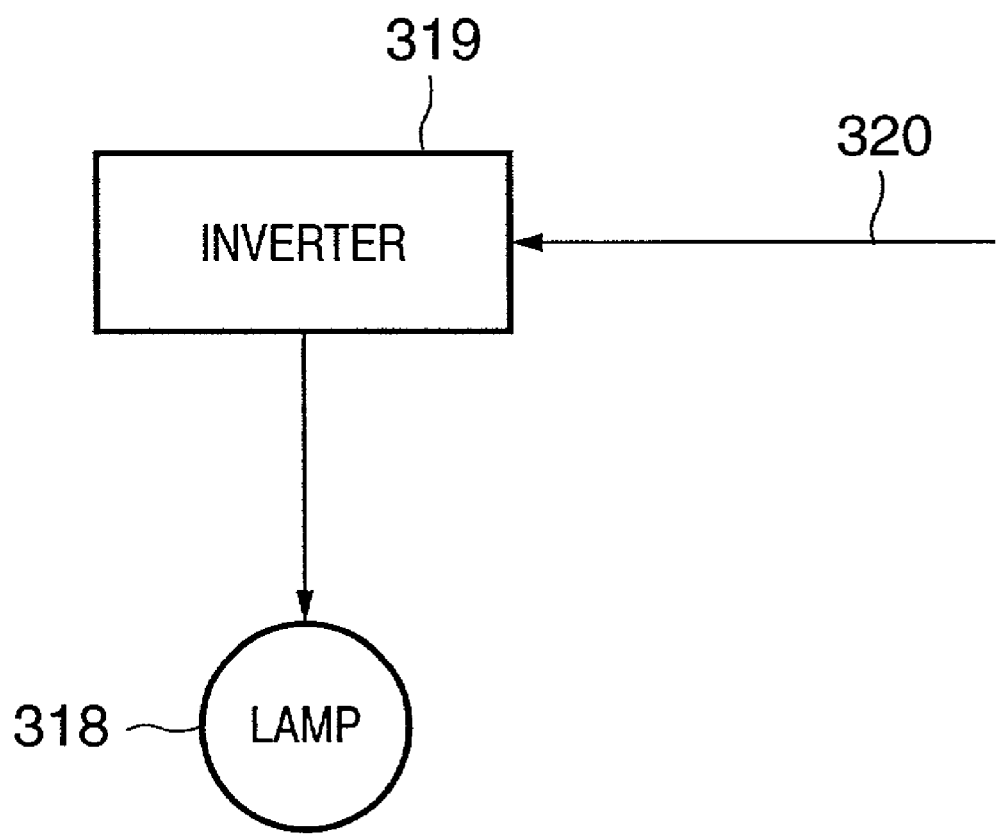
FIG. 12 is an internal block diagram of a transparent original unit.

FIG. 12 is an internal block diagram of the transparent original unit 302. In the figure, reference numeral 318 denotes a lamp for reading a transparent original, 319 denotes a control section of the lamp 318, and 320 denotes a communication line with the image reading apparatus 301 (corresponding to the communication line 305 of FIG. 10).

Figure 13:
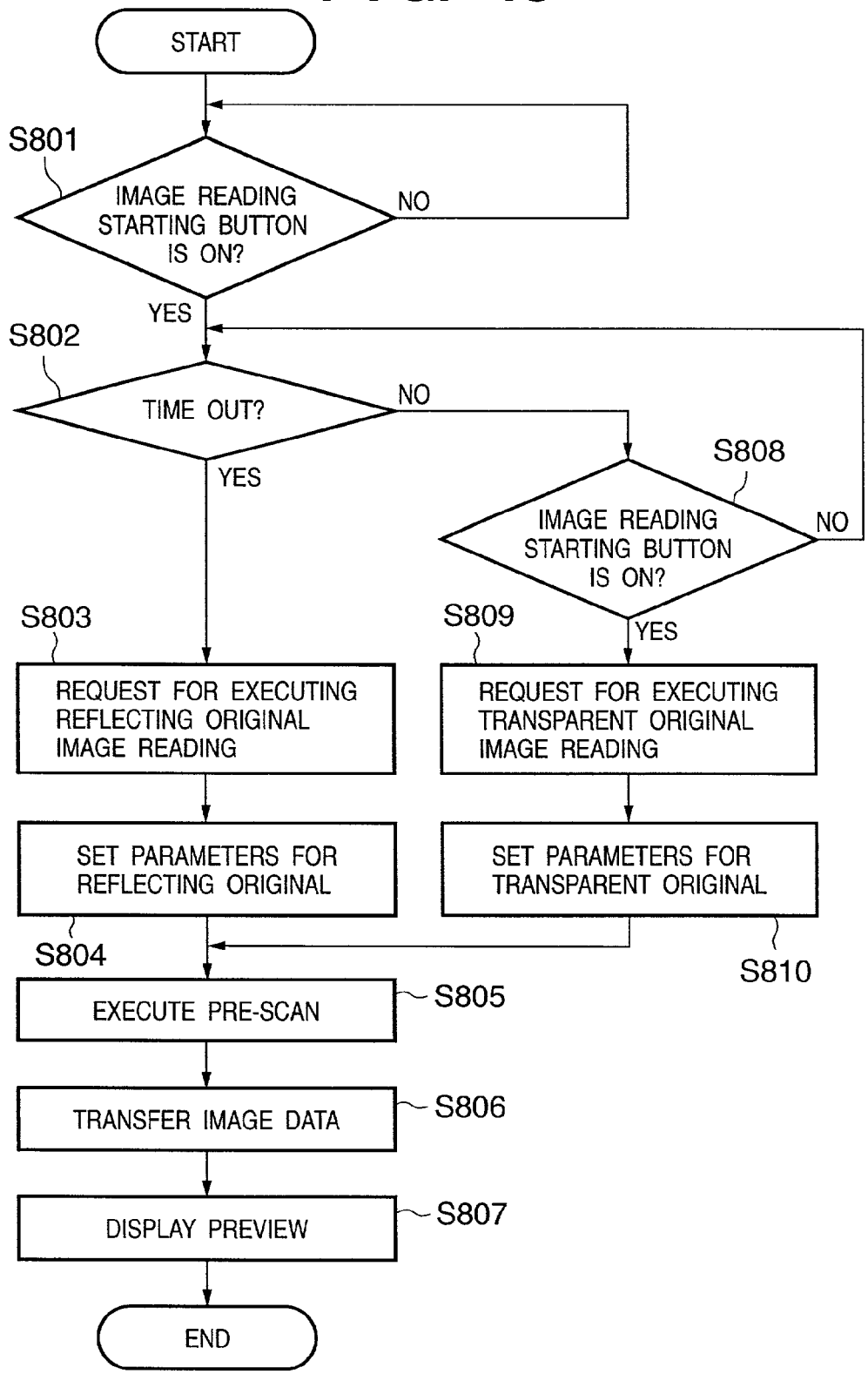
FIG. 13 is a flow chart describing an outline of operations in the image reading system of the second embodiment.

An outline of operation in the above-mentioned image reading system will now be described with reference to a flow chart of FIG. 13. The image reading apparatus 301 has the image reading starting button 303 and is connected to the host PC 306 by the communication line 304 and to the transparent original unit 302 by the communication line 305. The transparent original unit 302 is connected to the image reading apparatus 301 by the communication line 305. The host PC 306 is connected to the image reading apparatus 301 by the communication line 304 and is further connected to the monitor 307 for displaying a read image.

Usually, the image reading apparatus 301 initializes hardware and then enters a standby state if a power supply is simply turned on.

As in the above-mentioned second embodiment, a user sets an original that the user wishes to read in the image reading apparatus 301 and then, if the original is a reflecting original such as a normal printed matter, presses the image reading starting button 309 (303) only once.

The ASIC 310 detects that the image reading starting button 309 (303) is pressed only once (steps S801, S802), and a request to read a reflecting original is transmitted to the host PC306 via the communication interface section 311 and the communication line 316 (304) (step S803).

In this case, the host PC 306 executes image reading software installed previously and sets various parameters for a reflecting original and an image reading starting command that are required for initial reading of an image in the ASIC 310 in the image reading apparatus 301 in order to perform preview display (step S804).

The ASIC 310 in the image reading apparatus 301 in which the various parameters for a reflecting original and the image reading command are set via the communication line 316 (304) sets respective hardware, lights the lamp for reading a reflecting original 312 via the control section 313, drives the motor 314, moves the image reading section 308 and the lamp for reading a reflecting original 312 along the original and performs image reading of the reflecting original in accordance with respective sequences (step S805).

Image data of the read original is transmitted to the host PC 306 via the communication line 316 (304) (step S806), and the host PC 306 displays the image data on a screen of the monitor 307 connected to it as a preview screen (step S807).

On the other hand, if the original set in the image reading apparatus 301 is a transparent original such as a negative or positive film or the like of a photograph, the use quickly presses the image reading starting button 309 (303) set on the image reading apparatus 301 twice in a fixed time.

The ASIC 310 detects that the image reading starting button 309 (303) is pressed twice in a fixed time (steps S801, S802 and S808), and a request for reading a transparent original is transmitted to the host PC 306 via the communication interface section 311 and the communication line 316 (304) (step S809).

In this case, the host PC306 executes the image reading software and sets various parameters for a transparent original and an image reading starting command that are required for initial reading of an image in the ASIC 310 in the image reading apparatus 301 in order to perform preview display (step S810).

The ASIC 310 in the image reading apparatus 301 in which the various parameters for a transparent original and the image reading command are set via the communication line 316 (304) sets respective hardware, lights the lamp for reading a transparent original 318 via the control section 319 in the transparent original unit 302, drives the motor 314 in the image reading apparatus 301, moves the image reading section 308 in the image reading apparatus 301 along the original and performs image reading of the transparent original in accordance with respective sequences (step S805).

Image data of the read transparent original is transmitted to the host PC 306 via the communication line 316 (304) (step S806), and the host PC 306 displays the image data on a screen of the monitor 307 connected to it as a preview screen (step S807).

As described above, the image reading starting button 303 is provided in the image reading apparatus 301, the image reading starting button 303 is pressed with the number of times that is changed such as once in the case in which an original to be read is a reflecting original and twice quickly for a fixed time in the case in which an original to be read is a transparent original, selects contents of a request for starting image reading according to the state of the number of times that the button is pressed or the like and transmits the contents to the host PC 306 via the communication line 304.

The host PC 306 that has received the request for starting image reading executes image reading software, selects parameters and a sequence in the image reading software according to its contents and transmits them to the image reading apparatus 301 via various parameters and an image reading starting command according to the respective image reading software.

The image reading apparatus 301 sets respective hardware and then performs pre-scan and transmits a read image to the host PC306 according to the various parameters and the command set by the host PC 306, and the host PC 306 displays the image on the monitor 307 as a preview image.

With the configuration as described above, a user can easily perform image reading of a reflecting original and a transparent original without retrieving and designating image reading software previously. Moreover, since it is sufficient to dispose only one image reading starting button 303, it becomes possible to increase operability.

[Other Embodiments]

An image reading apparatus that is implemented by supplying a program code of software for realizing the functions of the above-mentioned embodiments to a computer in an apparatus or a system connected to various devices so as to cause the various devices to operate in order to realize the functions of the above-mentioned embodiments and causing the various devices to operate in accordance with a program stored in a computer (CPU or MPU) of the system or the apparatus is also included in the category of the present invention.

In addition, in this case, the program code itself of the above-mentioned software realizes the functions of the above-mentioned embodiments, and the program code itself and means for supplying the program code to the computer, for example, a recording medium storing such a program code constitute the present invention. As a recording medium for storing such a program code, for example, a floppy disk, a hard disk, an optical disk, a magneto-optical disk, a CD-ROM, a magnetic tape, a nonvolatile memory card, a ROM or the like can be used.

In addition, it is needless to mention that, in the case in which not only the functions of the above-mentioned embodiments are realized by the computer executing the supplied program code but also the functions of the above-mentioned embodiments is realized by the program code cooperating with an OS (operating system) running on the computer, other application software or the like, such a program code is included in the embodiment of the present invention.

Moreover, it is needless to mention that, in the case in which a supplied program code is stored in a memory provided in a function extension board of the computer or a function extension unit connected to the computer and then a CPU or the like provided in the function extension board or the function extension unit performs a part or all of actual processing based on an instruction of the program code, and the function of the above-mentioned embodiments are realized by the processing, such a program code is included in the present invention. Further, any of the form and the structure of each part shown in the above-mentioned embodiments only show an example of materialization in implementing the present invention, and the technical scope of the present invention should not be interpreted as being limited by these. That is, the present invention can be implemented in various forms without departing from its spirit or its main characteristics.

As described above, according to the second and the third embodiments, image reading of originals of different kinds can be performed easily and image reading excellent in operability can be realized.

The present invention is not limited to the above embodiments and various changes and modifications can be made within the spirit and scope of the present invention. Therefore, to apprise the public of the scope of the present invention the following claims are made.

What is claimed is:

1. An image reading apparatus comprising: a transparent platen on which an original is mounted;
an image reading unit for reading an original image while moving it with respect to said transparent platen; and
a transparent original reading unit including a surface light emitting section for lighting a transparent original mounted on said transparent platen from its back and a driving circuit section for driving said surface light emitting section,
wherein a start button for initiating a reading of a transparent original is provided in the vicinity of said driving circuit section including an electric switch for detecting depression of said start button for a transparent original, and said electric switch section is disposed on the same substrate as said driving circuit section and a start button for initiating a reading of a reflecting original that can be read only by operation of said image reading unit are provided.

* * * * *